US010197593B2

(12) United States Patent
Peters, Jr. et al.

(10) Patent No.: US 10,197,593 B2
(45) Date of Patent: Feb. 5, 2019

(54) MODULAR PORTABLE SPEEDOMETER CALIBRATION STAND

(71) Applicant: YIS/Cowden Group, York, PA (US)

(72) Inventors: Ricky E. Peters, Jr., York, PA (US); Robert A. Keough, Red Lion, PA (US); James E. Cowden, Cogan Station, PA (US)

(73) Assignee: YIS/Cowden Group, Williamsport, PA (US)

( * ) Notice: Subject to any disclaimer, the term of this patent is extended or adjusted under 35 U.S.C. 154(b) by 205 days.

(21) Appl. No.: 15/209,638

(22) Filed: Jul. 13, 2016

(65) Prior Publication Data

US 2017/0038409 A1    Feb. 9, 2017

Related U.S. Application Data

(60) Provisional application No. 62/191,565, filed on Jul. 13, 2015.

(51) Int. Cl.
*G01P 21/02* (2006.01)
*G01P 3/481* (2006.01)

(52) U.S. Cl.
CPC .............. *G01P 21/02* (2013.01); *G01P 3/481* (2013.01)

(58) Field of Classification Search
CPC ....................................................... G01P 21/02
See application file for complete search history.

(56) References Cited

U.S. PATENT DOCUMENTS

| 3,277,703 | A | | 10/1966 | Cline |
| 5,402,676 | A | | 4/1995 | Shibayama et al. |
| 5,465,616 | A | * | 11/1995 | Shibayama ............. G01L 5/282 |
| | | | | 73/115.01 |
| 5,656,764 | A | * | 8/1997 | Loeffler ............ G01M 17/0076 |
| | | | | 73/1.37 |
| 6,457,352 | B1 | | 10/2002 | Knestel |
| 6,561,013 | B1 | | 5/2003 | James |
| 6,813,939 | B1 | | 11/2004 | Wilcoxon |
| 7,784,335 | B2 | | 8/2010 | Fukamachi |
| 8,240,197 | B2 | | 8/2012 | Lawrence et al. |
| 2002/0000357 | A1 | | 1/2002 | Henderson |
| 2005/0262921 | A1 | * | 12/2005 | Arntz ....................... G01D 3/08 |
| | | | | 73/1.79 |

FOREIGN PATENT DOCUMENTS

| CN | 2338742 | 9/1999 |
| CN | 101183046 | 10/2012 |
| DE | 19529284 | 10/1996 |
| DE | 102010026615 | 1/2012 |

(Continued)

*Primary Examiner* — David M. Gray
*Assistant Examiner* — Andrew V Do
(74) *Attorney, Agent, or Firm* — Joseph E. Maenner; Maenner & Associates, LLC

(57) ABSTRACT

A portable speedometer calibration stand is disclosed. The stand includes a forward frame and two separate rear frame portions. Rollers rotatably mounted on each of the forward frame and the two separate rear frame portions engage tires of the test vehicle and allow the tires to rotate. Measurements of the speed of rotation of least one of the rollers allow the user to calculate speed of rotation of the tires and, from that calculation, calibrate the speedometer on the test vehicle.

17 Claims, 16 Drawing Sheets

(56) References Cited

FOREIGN PATENT DOCUMENTS

| | | |
|---|---|---|
| EP | 1253416 | 8/2012 |
| FR | 2875906 | 3/2006 |
| JP | 9250969 | 9/1999 |
| WO | WO2001082645 | 11/2001 |
| WO | WO2007048892 | 5/2007 |
| WO | WO2008119326 | 10/2008 |
| WO | WO2011151342 | 12/2011 |
| WO | WO2014068239 | 5/2014 |

* cited by examiner

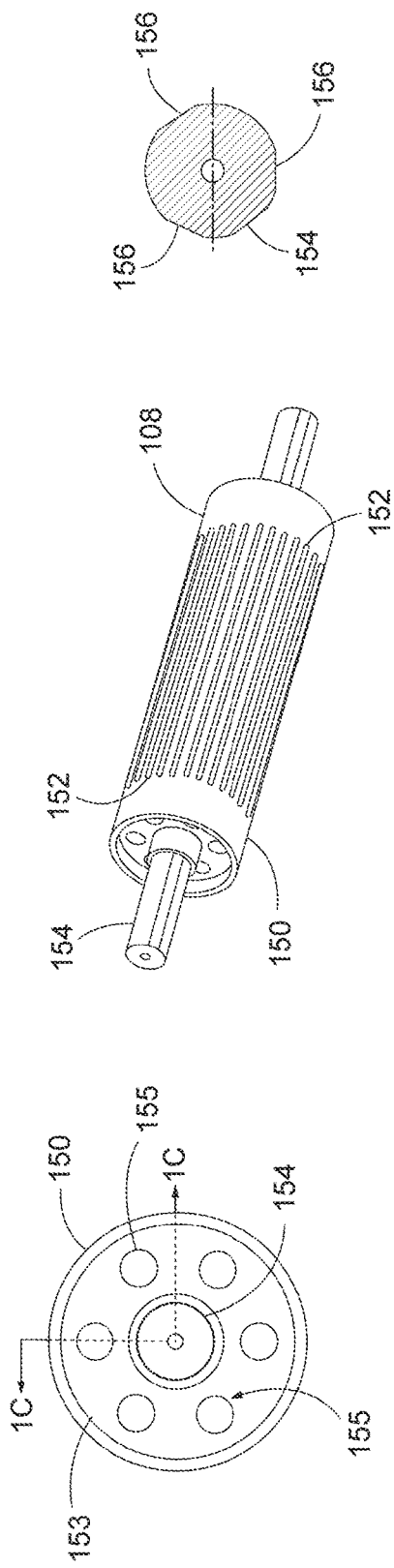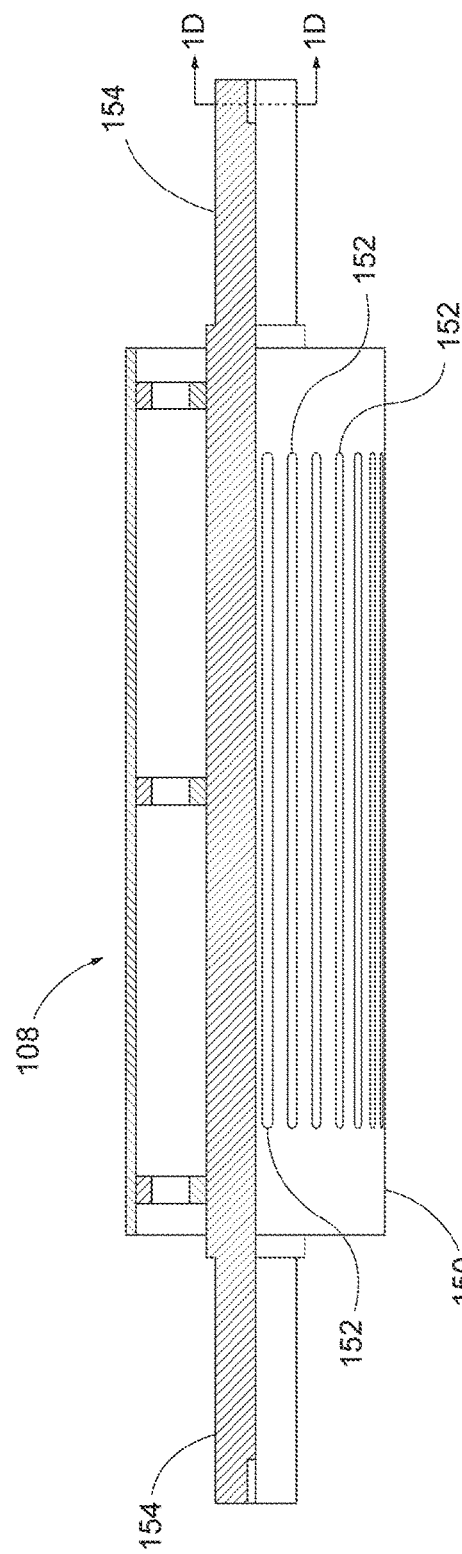

MODULAR PORTABLE SPEEDOMETER CALIBRATION STAND

CROSS-REFERENCE TO RELATED APPLICATION

The present application claims priority from U.S. Provisional Patent Application Ser. No. 62/191,565, filed on Jul. 13, 2015, which is incorporated by reference herein in its entirety.

BACKGROUND OF THE INVENTION

Vehicle speed determination is important, particularly for law enforcement vehicles, which occasionally determine the speed of another vehicle by "matching speeds" on a road or highway and determining the speed of that vehicle by observing the speedometer reading on the law enforcement vehicle. In order to ensure that the speedometer on the law enforcement vehicle is accurate, the speedometer is calibrated on a regular basis.

Rather than take the law enforcement vehicle out of service to travel to a certified speedometer calibration stand, it would be beneficial to provide a portable speed calibration stand that can be readily transported to the law enforcement location, such as a state police barracks or a local police station, so that the "down time" to a police vehicle to calibrate its speedometer is minimized, and to be able to calibrate multiple car speedometers in one setting.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a modular portable speedometer calibration stand comprising a forward frame including a first pair of forward rollers rotatably attached to the forward frame, a second pair of forward rollers rotatably attached to the forward frame, and a speed measuring device operatively coupled to a roller on one of the first and second pair of forward rollers. A rear frame is separate from the forward frame. The rear frame includes a first pair of rear rollers rotatably attached to the rear frame and a second pair of rear rollers rotatably attached to the rear frame.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 1A is a perspective view of a roller used with the calibration stand shown in FIG. 1;

FIG. 1B is a side elevational view of the roller shown in FIG. 1A;

FIG. 1C is a sectional view of the roller taken along lines 1C-1C of FIG. 1B;

FIG. 1D is a sectional view of a shaft of the roller taken along lines 1D-1D of FIG. 1C;

DETAILED DESCRIPTION OF THE INVENTION

Figure 1:
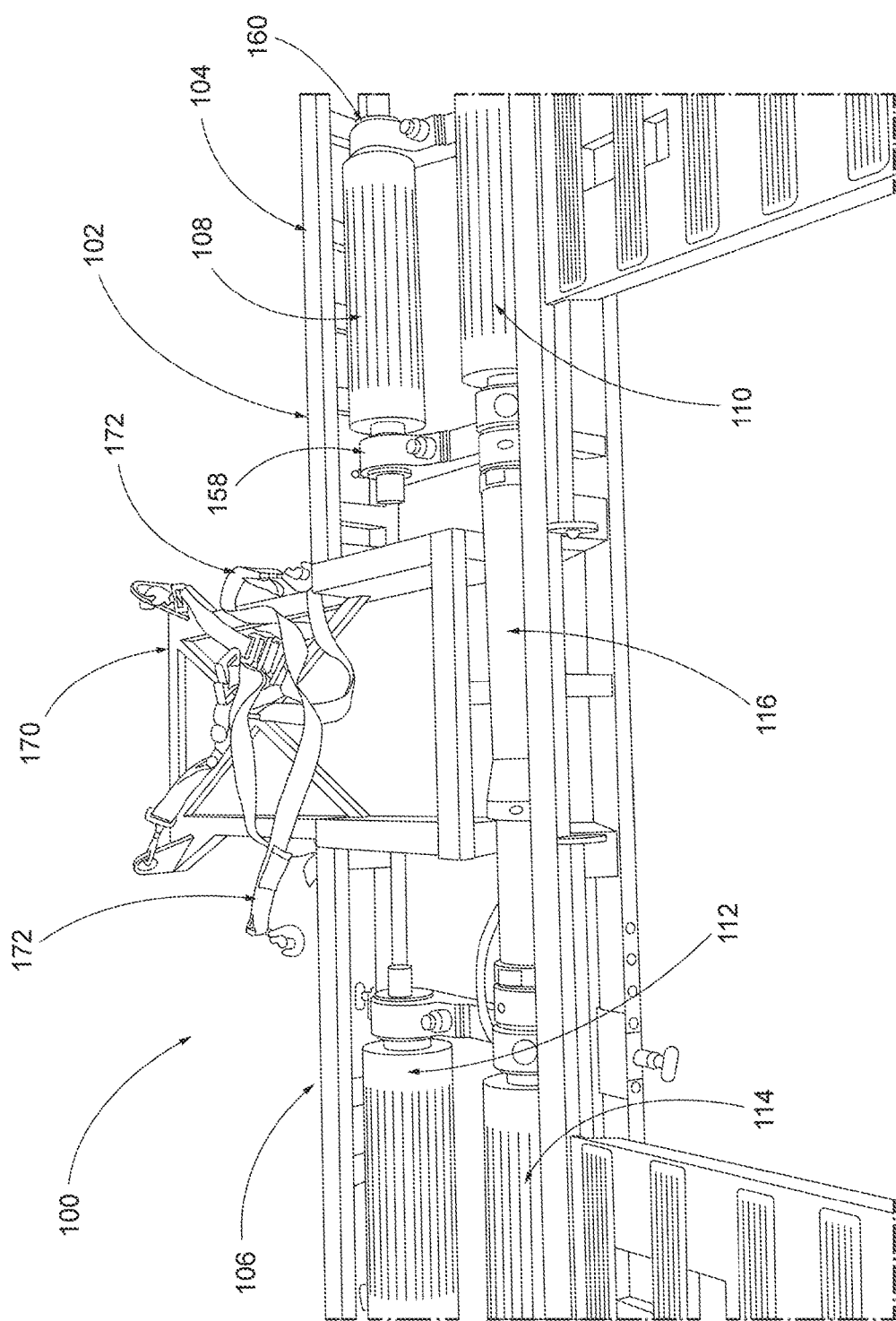
FIG. 1 is a perspective view of a forward portion of a modular portable speedometer calibration stand according to a first exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As shown in the Figures, the present invention is a modular portable speedometer calibration stand 100 for calibrating the speedometers on vehicles, such as, for example, police cars. Stand 100 is constructed from multiple separate parts that allow stand 100 to be disassembled; inserted into a truck or trailer (not shown); transported to a temporary location, such as, for example, a police station or barracks; and assembled in a short amount of time, such as, for example, about 10 minutes, for use at the temporary location.

Referring to FIG. 1, stand 100 includes a forward frame 102 having a right front portion 104 and a left front portion 106. Frame 102 is designated as "forward" when a front wheel drive or a four wheel drive vehicle is being tested on stand 100. If a rear wheel drive vehicle is being tested on stand 100, frame 102 is located to the rear of the vehicle. The description provided below relates to frame 102 in a forward position, although those skilled in the art will recognize that frame 102 can alternatively be located in the rear of the test vehicle.

In an exemplary embodiment, forward frame 102 is a single solid piece constructed from a plurality of welded frame members and has a length of about 113 inches and a width of about 28 inches. Right front portion 104 includes a pair of rollers 108, 110 on which a right front tire of the test vehicle rolls. An encoder 109 (shown in FIG. 4A) is attached to roller 108 to measure the speed of rotation of roller 108, and from that, calculate speed of rotation of the test vehicle tires.

Referring to roller 108 in FIGS. 1A-1D, roller 108 includes a wheel engagement portion 150 having a length of about 20 inches in order to accommodate a tire (not shown) of a test vehicle (not shown). In an exemplary embodiment, roller 108 is constructed from 11 gauge stainless steel. Wheel engagement portion 150 includes a plurality of longitudinally extending slots 152 along the length of wheel engagement portion 150 and having a length of about 15 inches each. Slot 152 provides for a gap between the tire and roller 108 when the tire is rolling on roller 108 to allow air to flow within slot 152 and to provide a cooling effect on roller 108.

Roller 108 includes a shaft 154 extending outwardly from either side thereof. Each end of shaft 154 includes a plurality of flats 156 formed therein, as shown FIG. 1D. Flats 156 accommodate journal bearings 158, 160 (shown in FIG. 1) that support either side of roller 108, respectively. Sidewalls 153 of roller 150 includes a plurality of circular openings 155 extending therethrough. Openings 155 are used to accommodate a manual brake inserted therein, as will be discussed in detail later herein. In an exemplary embodiment, roller 108 has an outer diameter of about 6 inches.

Figure 2:
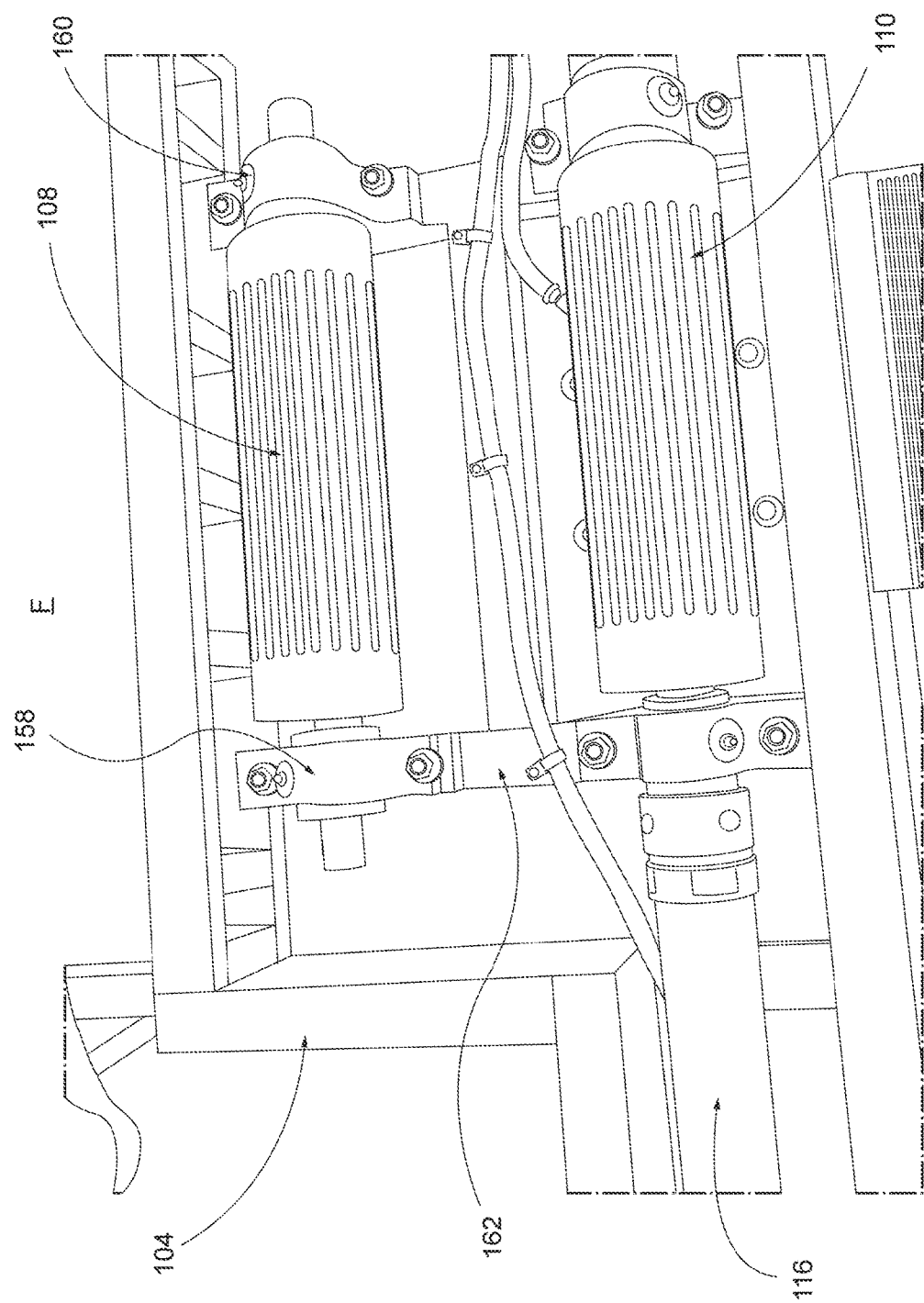
FIG. 2 is a top plan view of the right forward portion of the calibration stand shown in FIG. 1.

As shown in FIG. 2, rollers 108, 110 are mounted on a subframe 162 that is fixedly connected to right front portion 104 of forward frame 102. In an exemplary embodiment, roller 110 is spaced from roller 108 by a distance of about 14.25 inches center-to-center. Additionally, the maximum vertical height of rollers 108, 110 above a floor surface "F" onto which stand 100 is placed is about 7¾ inches. Further, a maximum vertical height of right front portion 104 of forward frame 102 above floor surface "F" is about 7⅝ inches, such that rollers 108, 110 extend above forward frame 102 by a distance of about ⅛ inches. Such a height differential allows the tires of the test vehicle to easily roll onto and off of rollers 108, 110 prior to and after testing.

Figure 3:
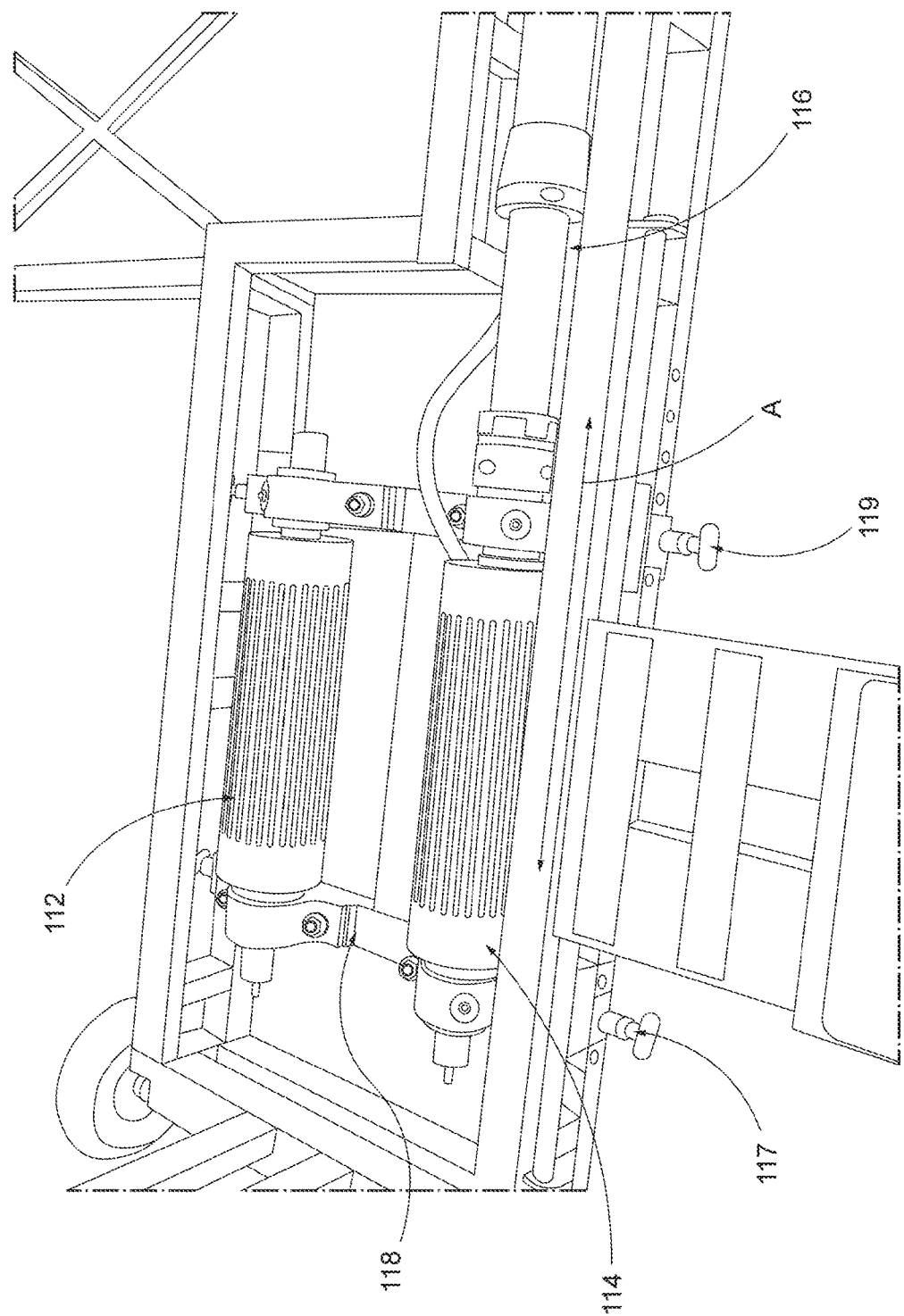
FIG. 3 is a top plan view of the left forward portion of the calibration stand shown in FIG. 1.

Similar to right front portion 104, as shown in FIG. 3, left front portion 106 includes a pair of rollers 112, 114 on which a left front tire of the test vehicle rolls. A telescoping shaft 116 (also shown FIG. 1) connects roller 110 to roller 114.

Figure 4:
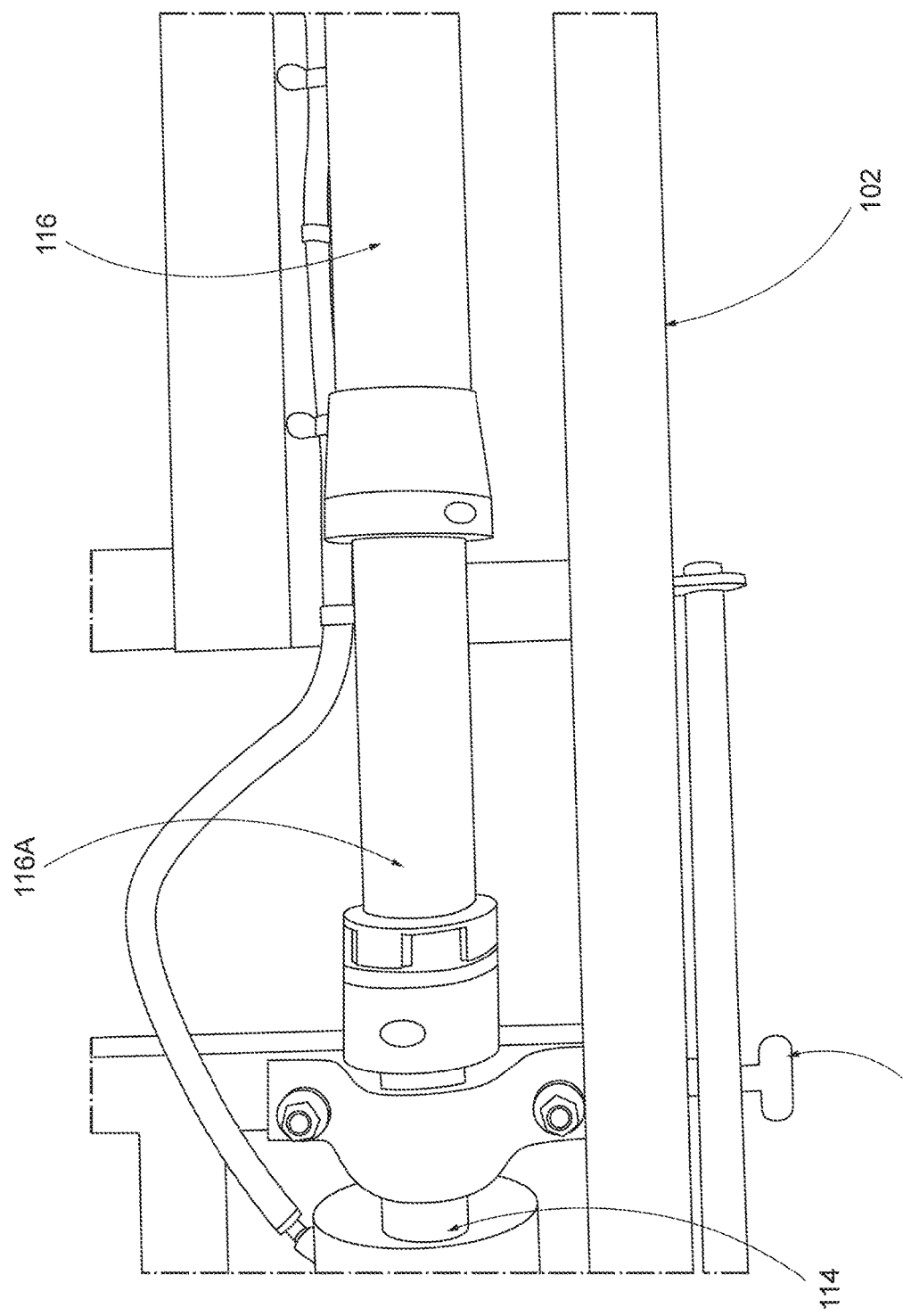
FIG. 4 is a top plan view of the shaft connecting the right forward portion of the calibration stand with the left forward portion of the calibration stand shown in FIG. 1.

As shown in FIG. 3, rollers 112, 114 are mounted on a frame 118 that is slidably mounted on left front portion 106 of frame 102 in order to allow frame 118 to be adjusted in the direction of arrow A to accommodate for vehicles having different wheel bases. Locks 117, 119 releasably secure frame 118 to forward frame 102. Accordingly, shaft 116 telescopes to accommodate the movement of frame 118. FIG. 4 shows shaft 116 with telescoping portion 116A connected to roller 114.

Alternatively, rollers 112, 114 can be wider, eliminating the need to slide frame 118 with respect to forward frame 102 and also eliminating the telescoping feature of shaft 116.

Referring back to FIG. 1, a vehicle securing portion 170 is located forward of shaft 116, and between rollers 108, 110 and rollers 112, 114. In an exemplary embodiment, securing portion 170 can be removably connected to forward frame 102. Vehicle securing portion 170 is part of forward frame 102, and includes a plurality of straps 172 that are secured to the vehicle in order to prevent the vehicle from inadvertently driving off the side of stand 100 during calibration testing.

Figure 4A:
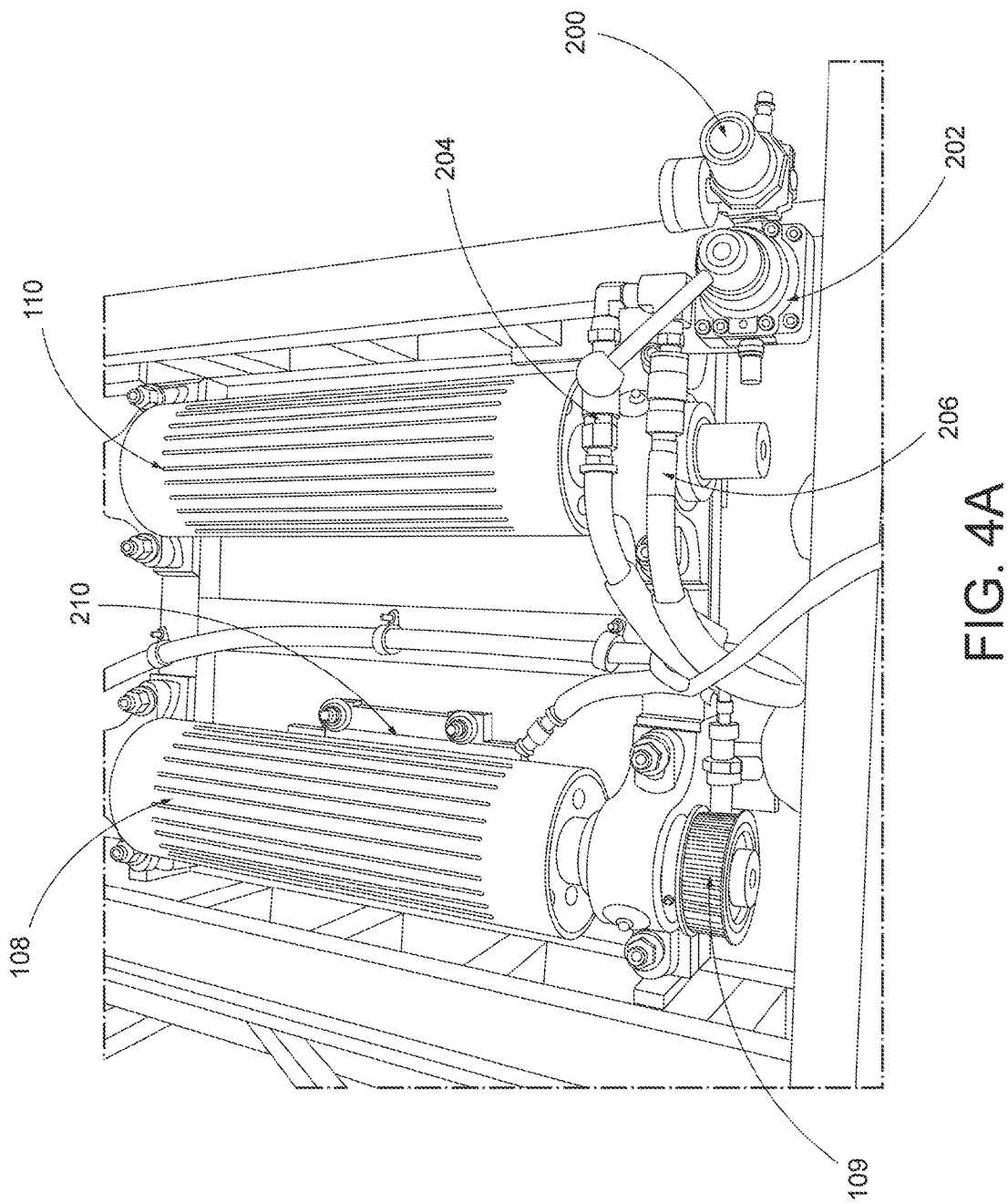
FIG. 4A is a perspective view of a pneumatic system for a brake assembly for the roller shown in FIGS. 1A-1D.
Figure 4B:
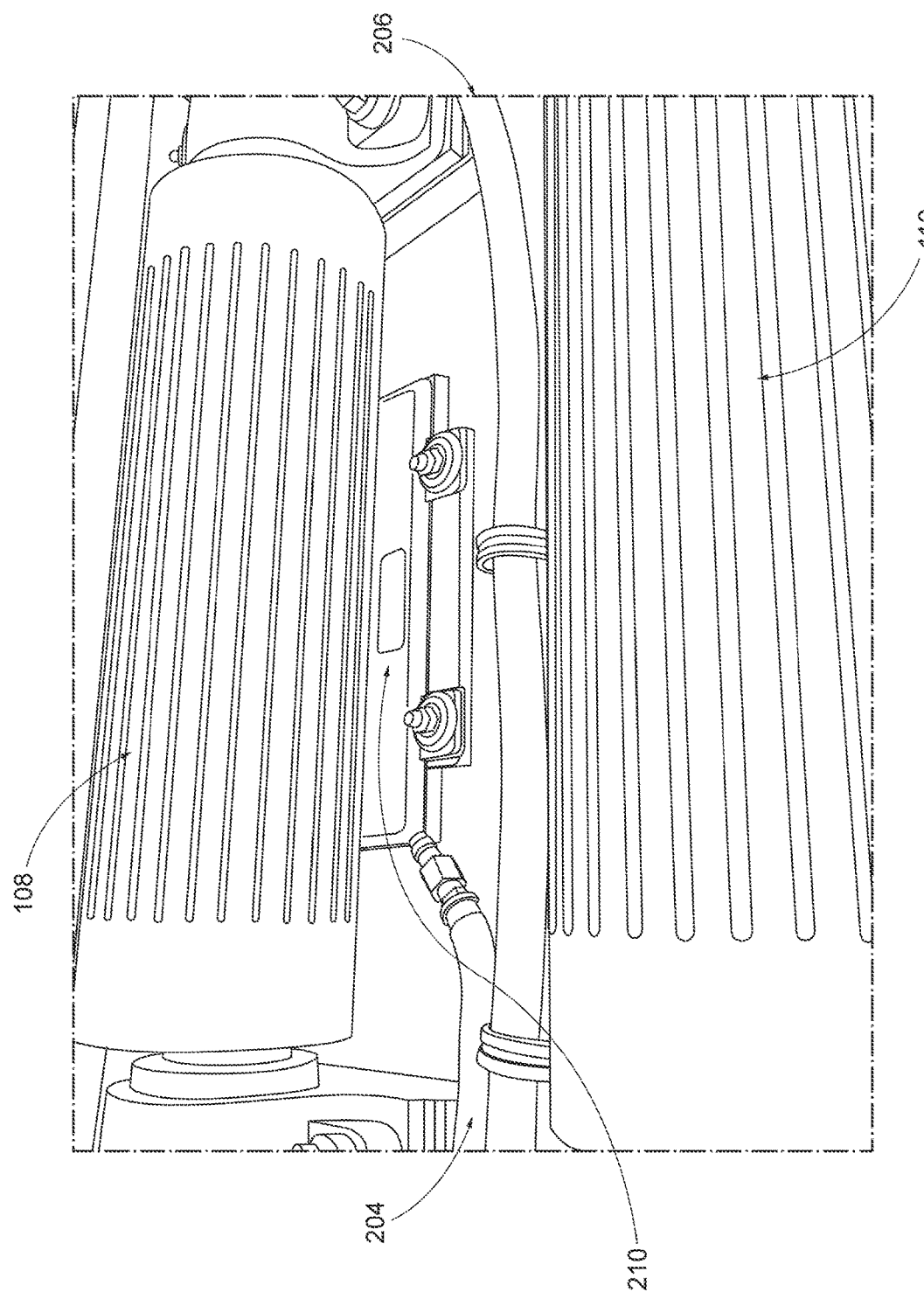
FIG. 4B is a perspective view of an airbag assembly used in the brake assembly shown in FIG. 4A.
Figure 4C:
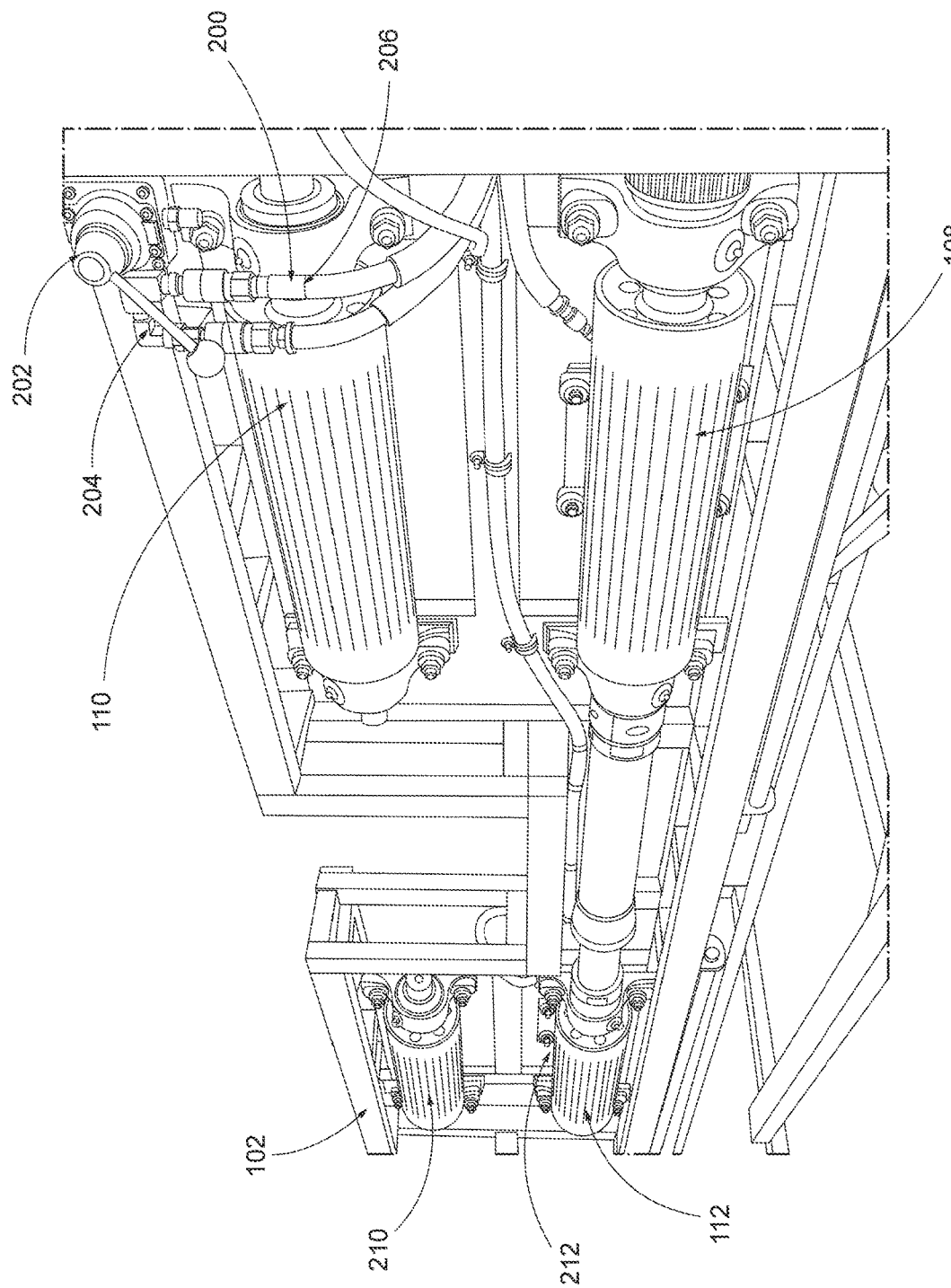
FIG. 4C is a perspective view of the brake assembly for both forward rollers of the calibration stand shown in FIG. 1.

Additionally, as shown in FIGS. 4A-4C, a pneumatic system 200 is provided as a braking system to secure rollers 108 and 112 to allow the test vehicle to roll off stand 100 after calibration testing is completed. Pneumatic system 200 includes a valve controller 202 that can selectively admit or secure pressurized air to a plurality of pneumatic air lines 204, 206. Pneumatic air line 204 provides fluid communication between valve controller 202 and an airbag assembly 210 that is located underneath roller 108. Similarly, pneumatic air line 206 provides fluid communication between valve controller 202 and an airbag assembly 212 that is located underneath roller 112.

After the test vehicle as finished its testing, valve controller 202 is operated to allow air from a pressurized air source (not shown) to travel through pneumatic air lines 204, 206 in order to inflate airbag assemblies 210, 212. When airbag assemblies 210, 212 are inflated, airbag assembly 210 frictionally engages roller 108 and airbag assembly frictionally engages roller 112 such that rollers 108, 112 are restricted from rolling, enabling the test vehicle to roll over rollers 108, 112 and off of test stand 100. After the test vehicle has rolled off of test stand 100, valve controller 202 is operated to secure the air from the pressurized air source, allowing airbag assemblies 210, 212 to deflate, so that rollers 108, 112 are free to roll.

Figure 4D:
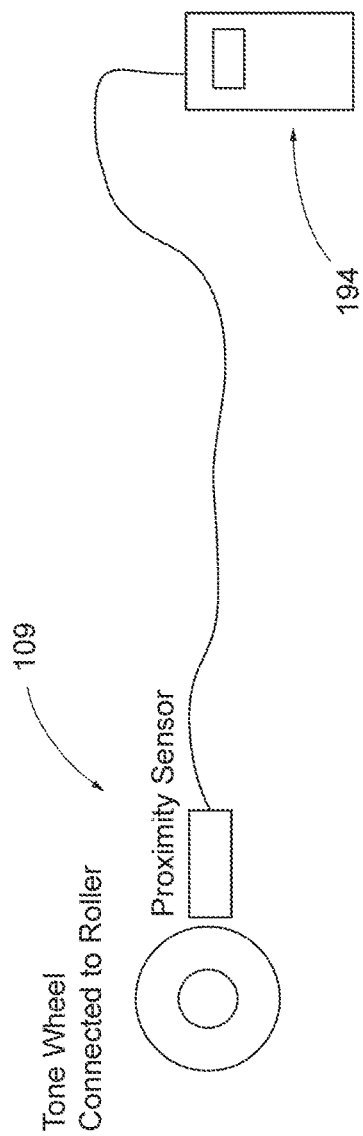
FIG. 4D is a side elevational view of an exemplary speedometer with display used with the calibration stand shown in FIG. 1.
Figure 4E:
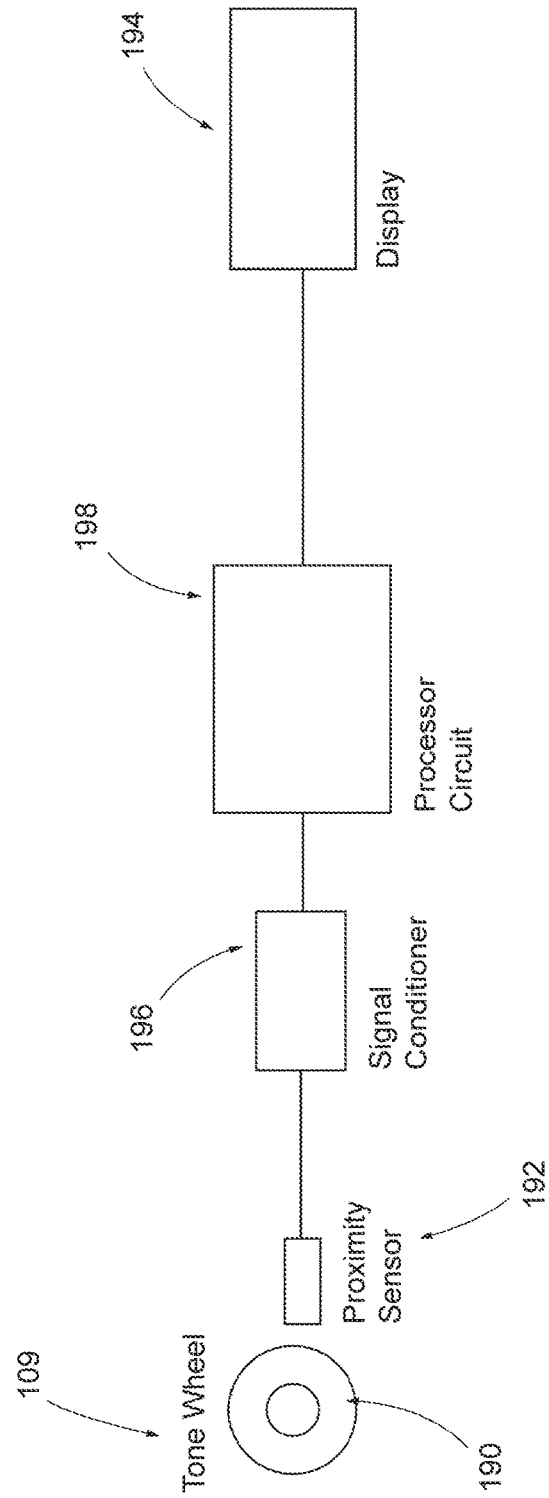
FIG. 4E is a schematic view of an exemplary electronics system used with the speedometer shown in FIG. 4D.

Referring to FIGS. 4D and 4E, an exemplary electronics system used to measure the speed of the test vehicle is provided. Encoder 109 includes a tone wheel 190 that is coupled to shaft 154 on roller 108. A proximity sensor 192 detects the rotation speed of tone wheel 190 and transmits pulses to a handheld display 194. The pulse information is processed by a signal conditioner 196 and a processor circuit 198 prior to being transmitted to display 194, which displays the test vehicle speed data.

Figure 5:
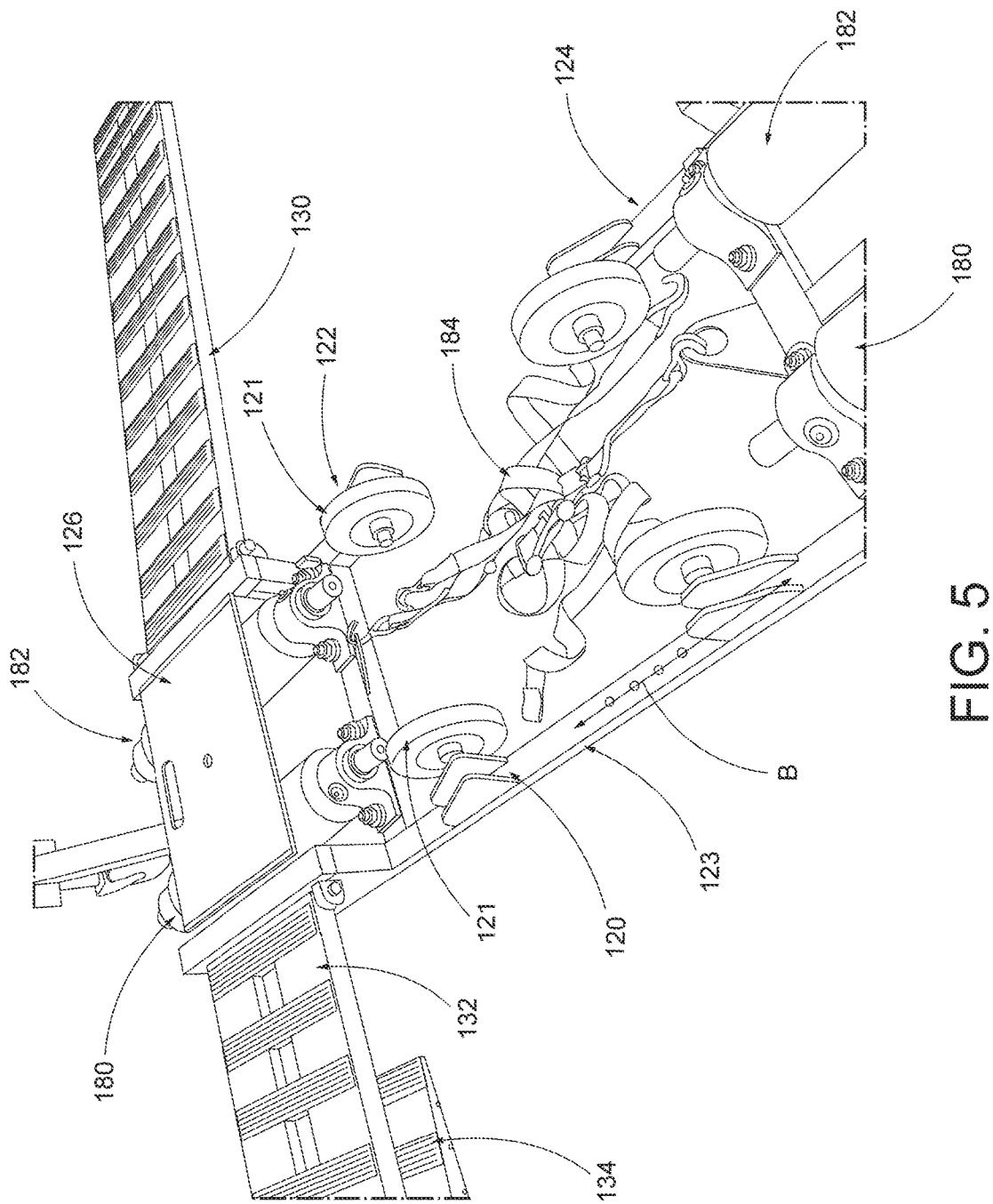
FIG. 5 is a perspective view of a rear right portion of the calibration stand of FIG. 1.

Referring to FIG. 5, stand 100 also includes a rear frame 120 that includes a right rear portion 122 adjustably connected to a left rear portion 124 along the direction of arrow B in order to accommodate for vehicles having different wheel bases, similar to the adjustment of frame 118, as discussed above. Wheels 121 support each of right rear portion 122 and left rear portion 124 so that right rear portion 122 and left rear portion 124 can be easily moved into position during assembly of stand 100. A connecting bar 123 slidably connects right rear portion 122 and left rear portion 124 to aid in adjusting the spacing between right rear portion 122 and left rear portion 124.

Each of right rear portion 122 and left rear portion 124 includes a wheel plate 126 (only shown over right rear portion 122 in FIG. 5) that is removably replaceable over rollers 180, 182 so that the front tires of the test vehicle can roll over rear frame 120, so that the front tires of the test vehicle can roll toward forward frame 102. After the front tires have passed over rear frame 120, but before the rear tires have passed over rear frame 120, the wheel plates 126 can be removed from right rear portion 122 and left rear portion 124 (shown with respect to left rear portion 124 in FIG. 6) so that the rear tires of the test vehicle rest in the rollers 180, 182 mounted in each of right rear portion 122 and left rear portion 124, respectively.

Additionally, tiedown straps 184 are secured to each of right rear portion 122 and left rear portion 124 and are connected to the test vehicle in order to further secure the test vehicle to rear portions 122, 124 of stand 100.

Figure 6:
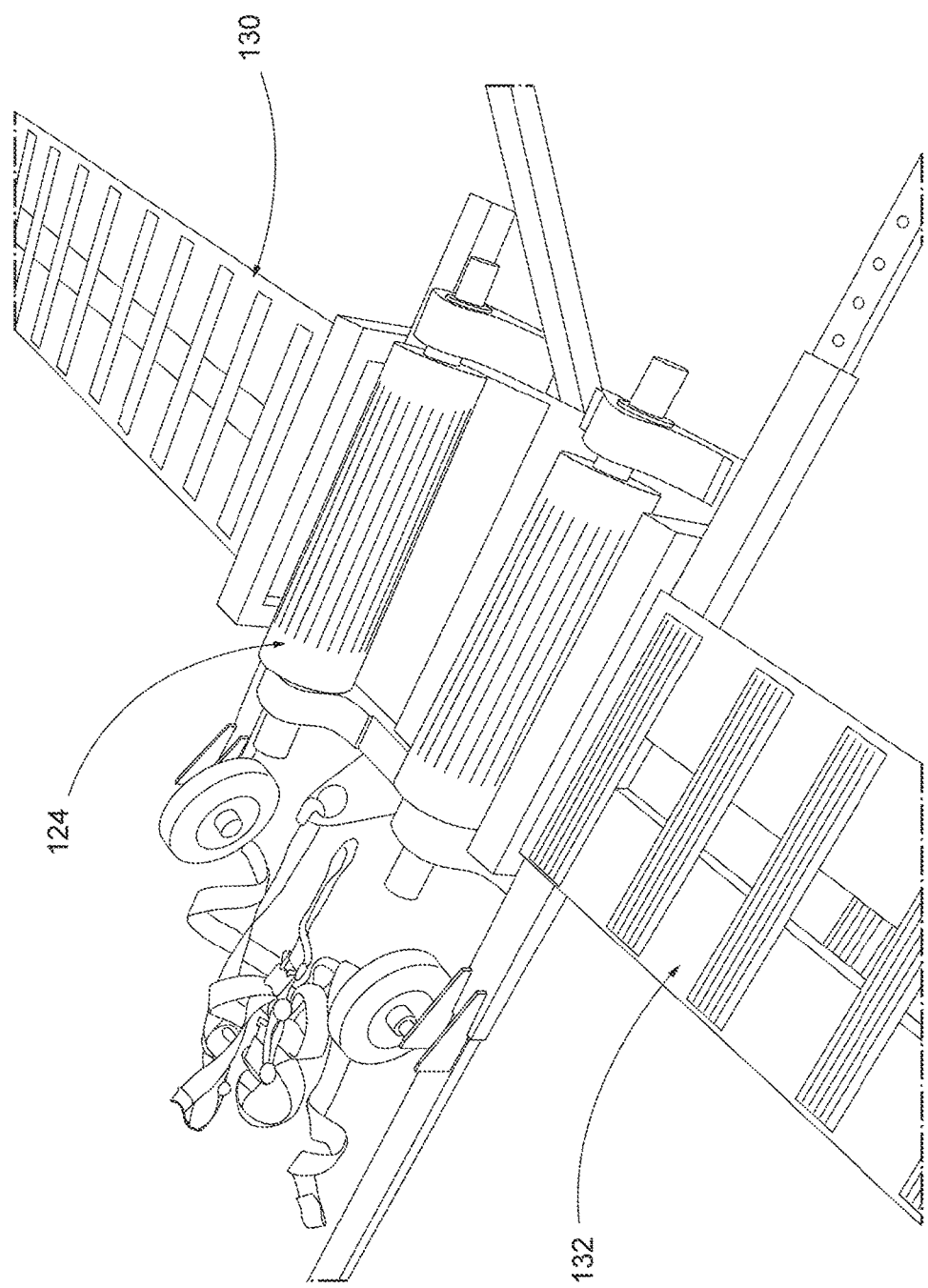
FIG. 6 is a perspective view of a left rear portion of the calibration stand of FIG. 1.
Figure 7:
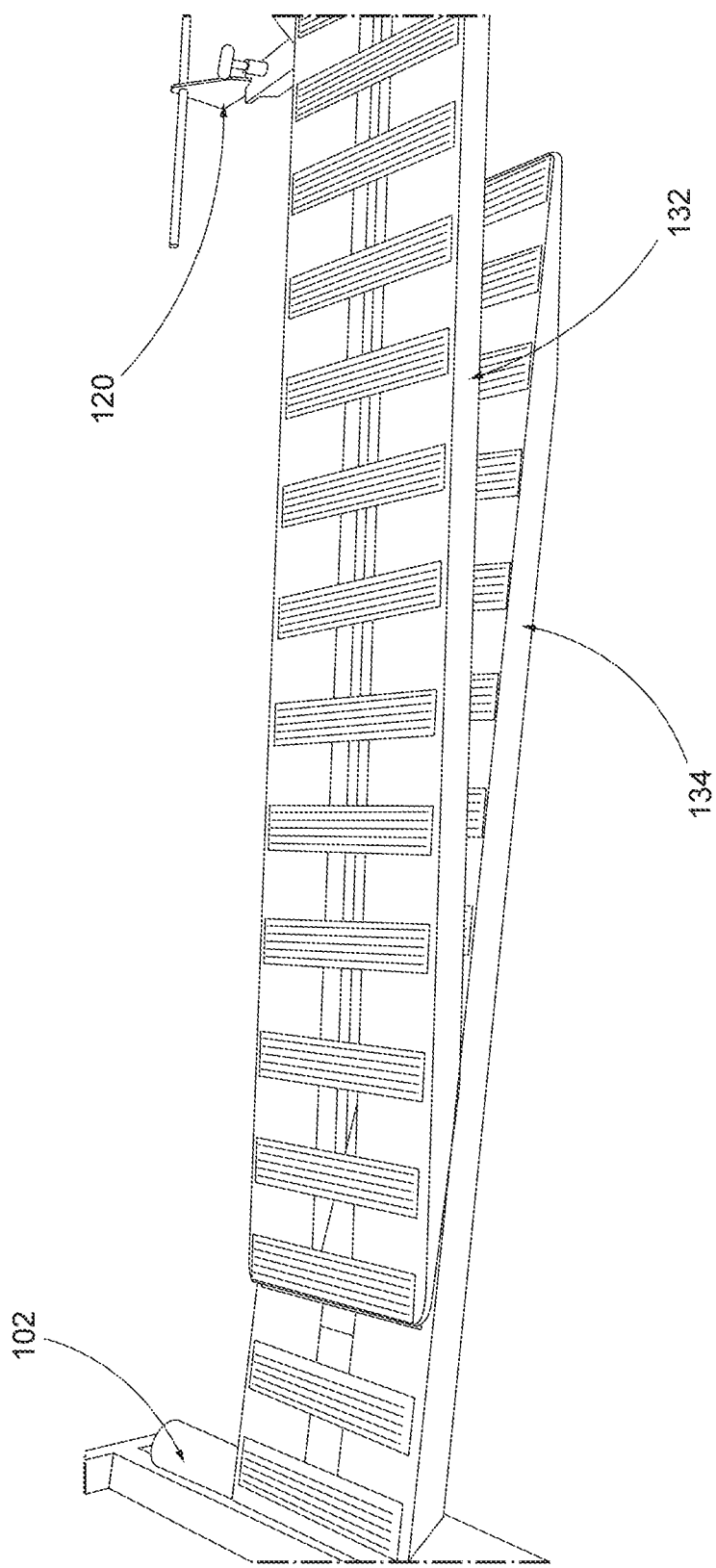
FIG. 7 is a perspective view of a ramp assembly used to allow traversing of a vehicle between and a rear portion of the calibration stand of FIG. 1.

As shown in FIGS. 5-7, removable ramps 130, 132, 134 are used to elevate test vehicle onto stand 100. Ramp 130 is used to elevate the test vehicle from the ground upward and over rear frame 120. Intermediate ramp 132 is used to allow test vehicle to travel between rear frame 120 and forward frame 102. Ramp 134 supports a forward end of intermediate ramp 132 and also can be used to elevate the test vehicle from the ground upward and over forward frame 102, when rear frame 120 is removed (used only for rear wheel drive vehicles).

Figure 8:
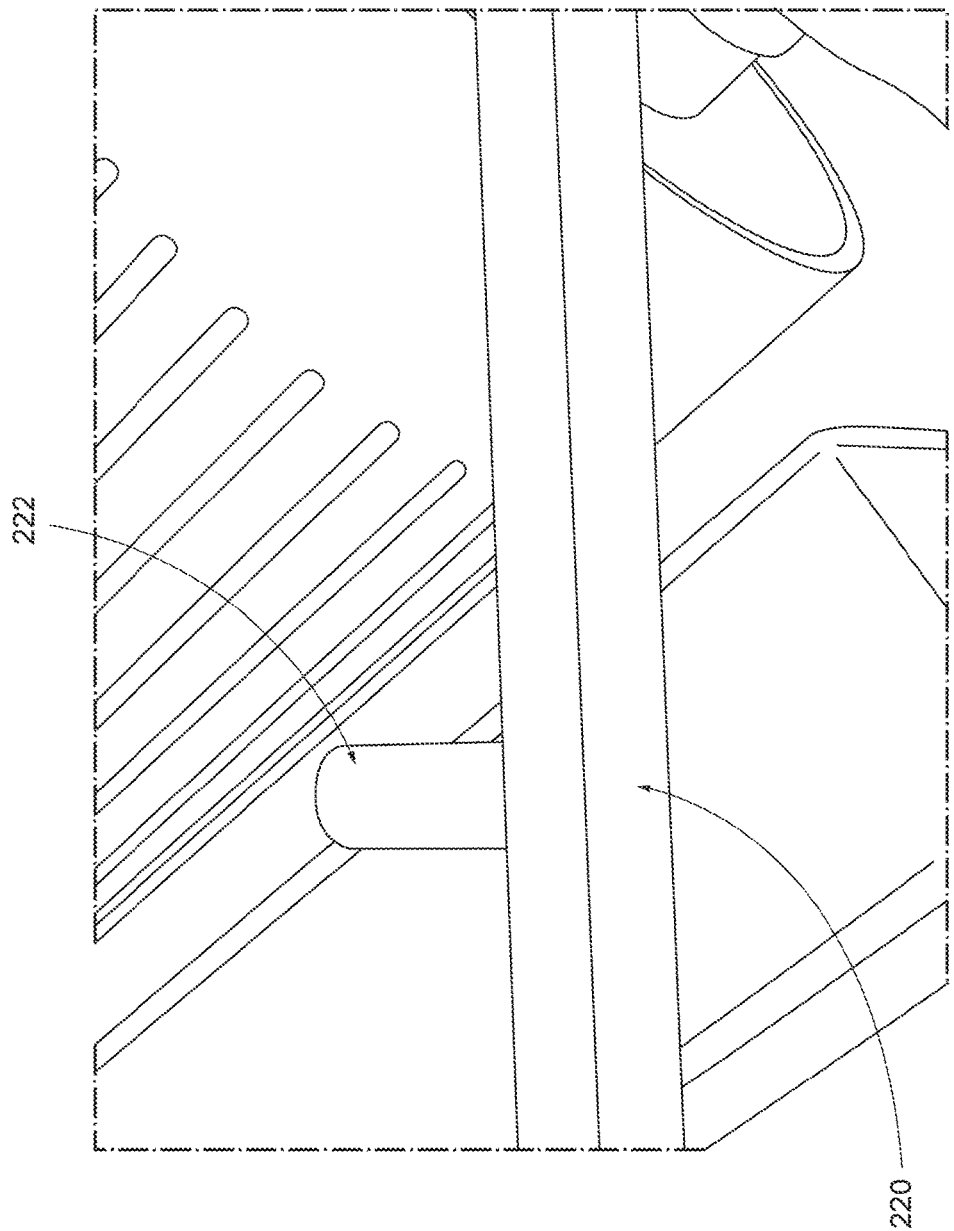
FIG. 8 is a perspective view of a lock bar used to lock rear rollers on the calibration stand shown in FIGS. 5 and 6.
Figure 9:
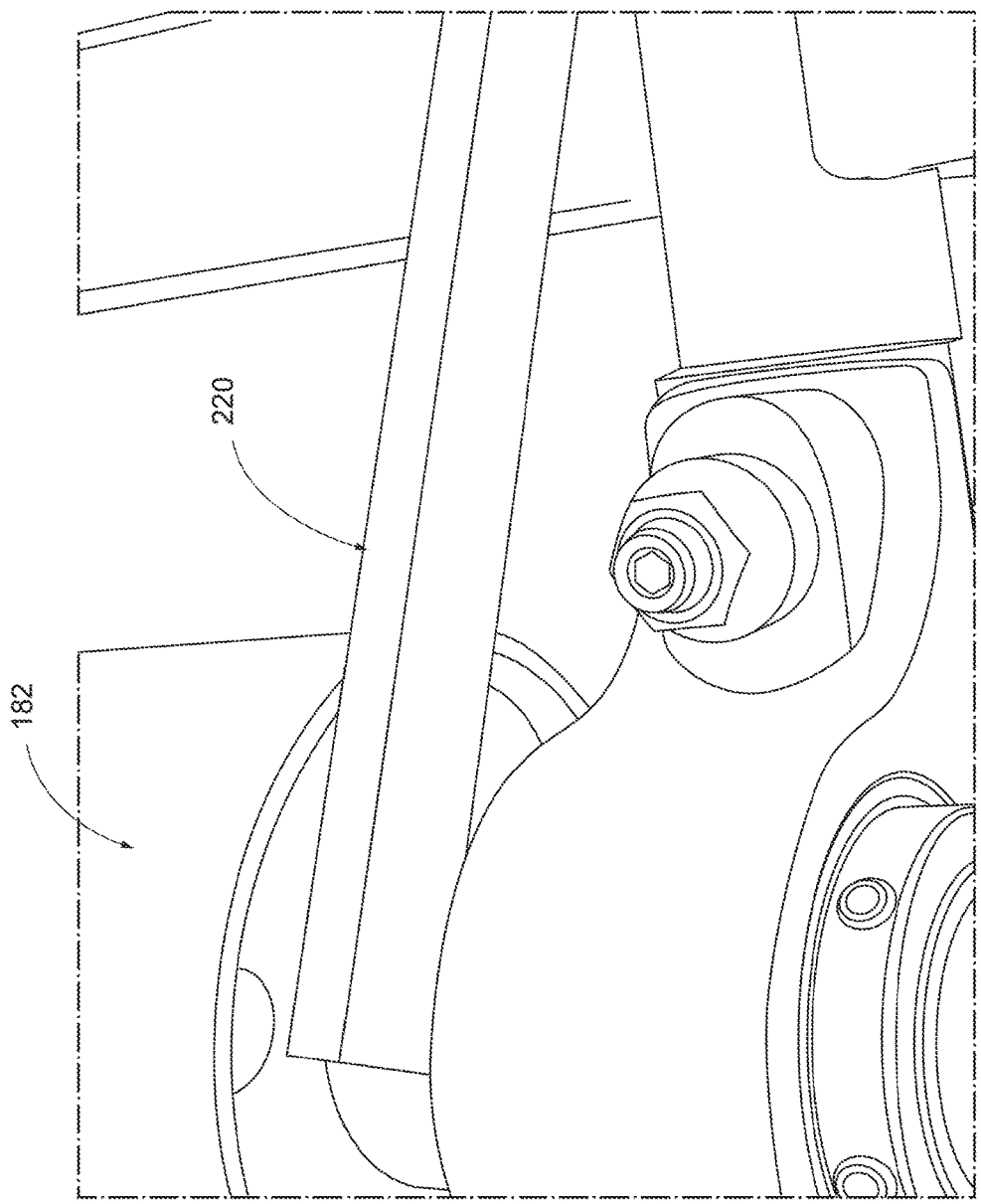
FIG. 9 is a perspective view of the lock bar shown FIG. 8 inserted into a rear roller on the calibration stand shown in FIG. 5.

Referring to FIGS. 8 and 9, a lock bar 220 used to secure each of rear rollers 182 is shown. Lock bar 220 is a generally elongated metal rod having a rectangular cross-section. Lock bar 220 includes an insert 222 that extends generally orthogonally outwardly from lock bar 220. Insert 222 is sized to allow insert 222 to be inserted into one of openings 155 in roller 182, as shown in FIG. 9. When the test vehicle rolls roller 182, roller 182 rotates with lock bar 220 until lock bar 220 engages right rear portion 122, and prevents roller 182 from any further rotation. At that point, the test vehicle rolls over roller 182 and off of any parts of frame 102 or rear portions 122, 124.

Optionally, although not shown, pneumatic system 200 can be omitted and additional lock bars 220 can be inserted into rollers 108, 112 in a similar manner that lock bars 220 are inserted into rollers 182 in order to restrict the rotation of rollers 108, 112.

In operation, forward frame 102 is placed in a desired location. For each specific make/model of a test vehicle, the distance between the left front tire of the right front tire of the test vehicle is known and frame 118 is adjusted along forward frame 102 along the direction of arrow "A" (shown FIG. 3) to provide desired spacing between rollers 108, 110 and rollers 112, 114 such that forward tires of the test vehicle can be received by rollers 108, 110 and rollers 112, 114 when the test vehicle is rolled in the position. As frame 118 is slid, shaft 116 telescopes accordingly.

Similarly, right rear portion 122 and left rear portion 124 are spaced apart from each other along the direction of arrow "B" (shown in FIG. 5) by the same distance to provide desired spacing between rollers 180, 182 on right rear portion 122 and rollers 180, 182 on left rear portion 124. Additionally, for the specific make/model of the test vehicle, the distance between the front tires and the rear tires of the test vehicle is known, such that right rear portion 122 and left rear portion 124 are spaced sufficiently away from forward frame 102. Next, ramps 130, 132, and 134 are removably connected to right rear portion 122, left rear portion 124, and forward frame 102 as shown in FIGS. 5-7 and wheel plates 126 are placed over each pair of rollers 180, 182.

After frame 102, right rear portion 122, left rear portion 124, ramps 130, 132, 134 and wheel plates 126 are in place, the test vehicle is rolled up ramp 130, over wheel plates 126, and onto the combination of ramps 132, 134. When the front tires of the test vehicle are forward of rollers 180, 182 but the rear tires of the test vehicle are still behind rollers 180, 182, the test vehicle is stopped so that wheel plates 126 can be removed.

The test vehicle is moved forward and onto forward frame 102, such that the right front tire of the test vehicle settles into the gap between rollers 108, 110 and that the left front tire of the test vehicle settles into the gap between roller 112 and roller 114. Similarly, the right rear tire of the test vehicle settles into the gap between rollers 180, 182 on right rear portion 122 and the left rear tire of the test vehicle settles into the gap between rollers 180, 182 on the left rear portion 124.

Once the tires of the test vehicle have settled into their respective rollers, straps 172, 184 are secured to the test vehicle in order to restrict the test vehicle and prevent inadvertent movement of the test vehicle from stand 100.

When the test vehicle is secured to stand 100, the accelerator pedal of the test vehicle is pressed by an operator such that the tires of the test vehicle rotate, and, in turn, rotates their respective rollers. Encoder 109 mounted on roller 108 measures the speed of rotation of roller 110, which can then be converted to calculate the speed of rotation of the right front tire of the test vehicle. The speedometer of the test vehicle is then calibrated according to known calibration standards.

After the calibration process is complete, the test vehicle is stopped and straps 172, 184 are removed from the test vehicle. Airbag assemblies 210, 212 are activated by opening a valve controller 202. Airbag assemblies 210, 212 frictionally engage their respective rollers 108, 112, preventing rollers 108, 112 from rotating. Additionally, a lock bar 220 inserted into an opening 155 in each of rear rollers 182, restricting the rotation of rear rollers 182.

With rollers 108, 112, and 182 secured to prevent rotation, the test vehicle is then rolled backward until the tires of the test vehicle are rolled out of their respective rollers. Wheel plates 126 are placed over their respective rear rollers 180, 182 so that the front tires of the test vehicle can be rolled over wheel plates 126, down ramp 130, and off of stand 100.

If a subsequent test vehicle is the same make/model of the first test vehicle, test stand 100 does not necessarily need to be adjusted. If, however, the subsequent test vehicle is a different make/model than the first test vehicle, test stand 100 may need to be realigned in order to accommodate for the wheelbase of the subsequent test vehicle prior to rolling the subsequent test vehicle onto stand 100.

Optionally, if the test vehicle is only a two-wheel drive vehicle, right rear portion 122 and left rear portion 124 of stand 100 can be omitted, along with ramps 132. Once frame 118 is spaced relative to frame 162 to accommodate the spacing between left and right tires of the test vehicle, the test vehicle can be driven directly up ramp 134 until its tires settle into the gap between rollers 108, 110 and the gap between rollers 112, 114. It is understood that, if the test vehicle is a front wheel drive vehicle, the test vehicle is driven forward onto stand 100 and, if the test vehicle is a rear wheel drive vehicle, the test vehicle is driven in reverse onto stand 100.

While test stand 100 is used to calibrate speedometers, those skilled in the art will recognize that test stand 100 can be modified for other purposes, such as, for example, for torque and horsepower measurement (i.e. a dynamometer), or other purposes.

Figure 10:
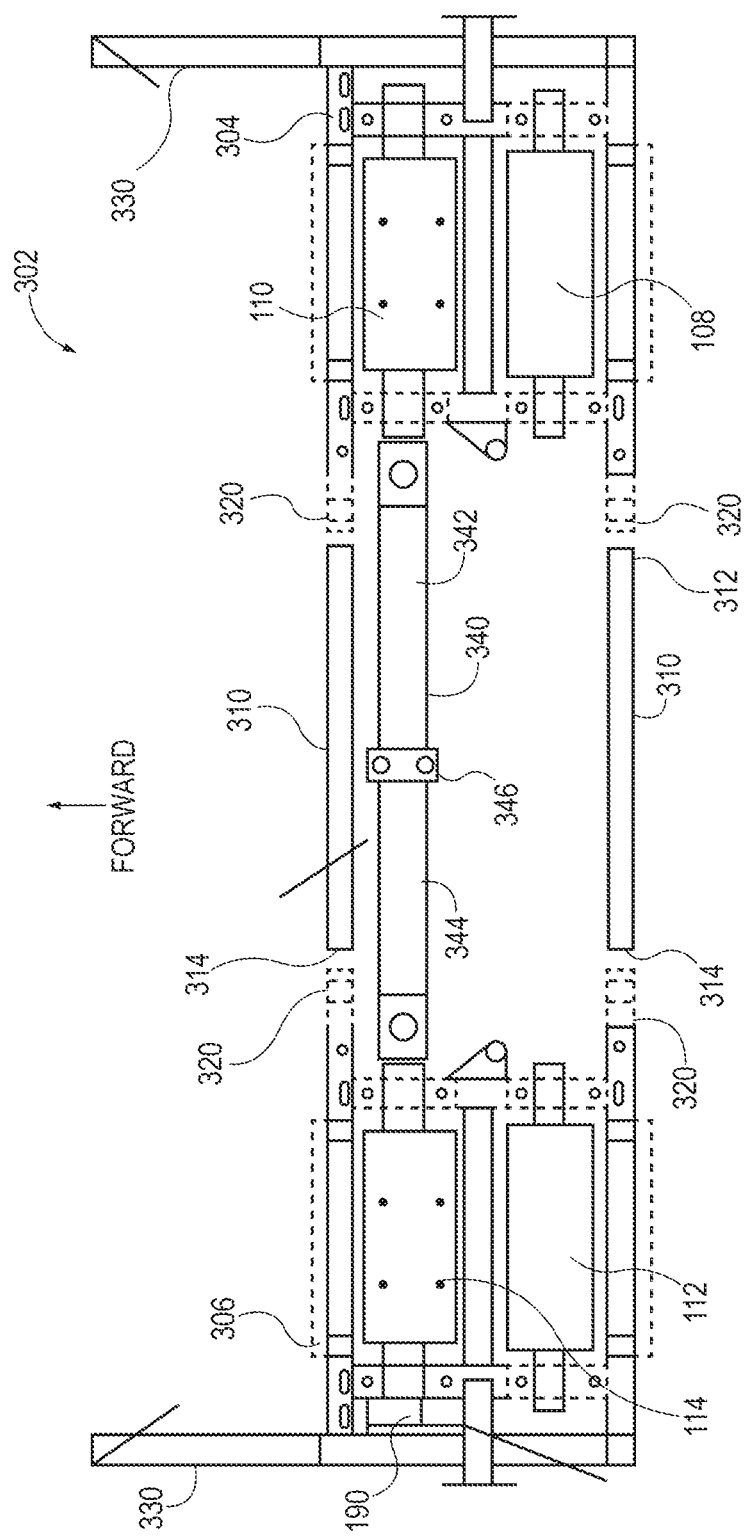
FIG. 10 is a top plan view of an alternative embodiment of a forward frame assembly according to the present invention.
Figure 11:
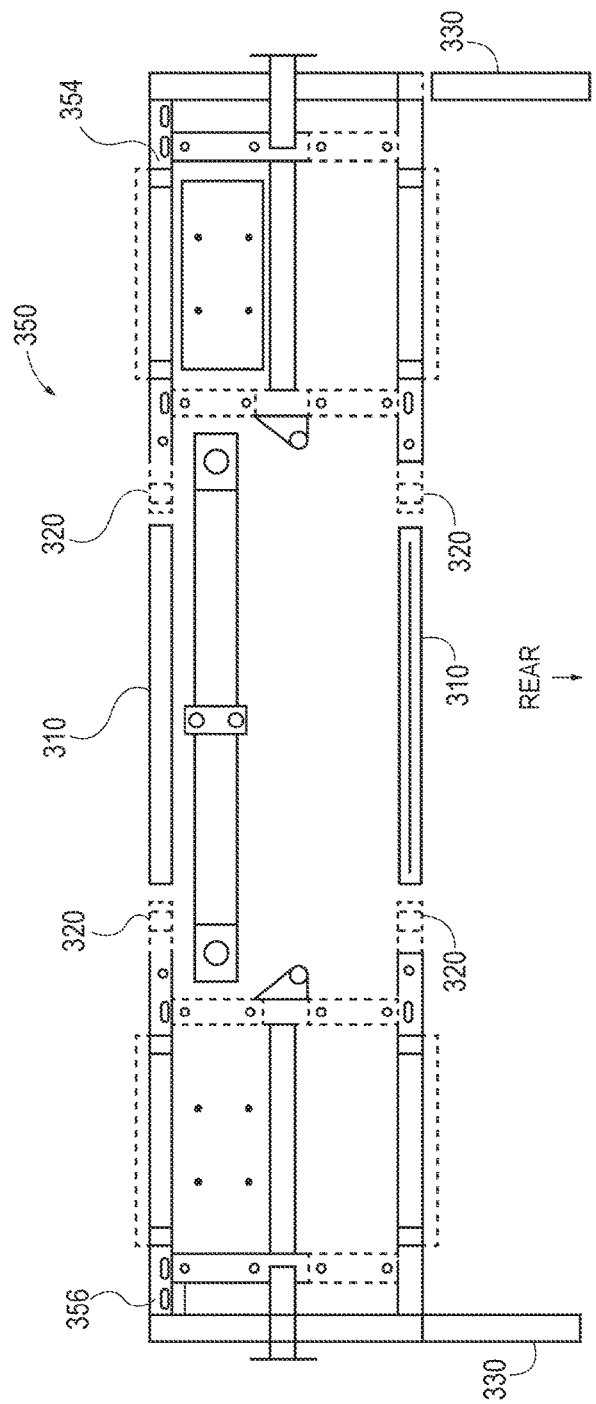
FIG. 11 is a top plan view of an alternative embodiment of a rear frame assembly according to the present invention.
Figure 12:
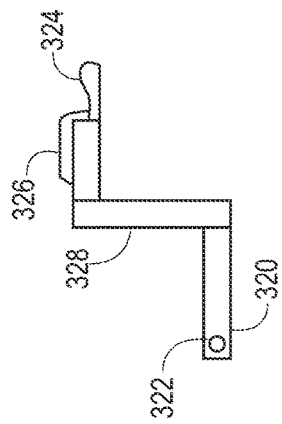
FIG. 12 is a side elevational view of a coupling link used with either the forward frame assembly shown in FIG. 10 or the rear frame assembly shown in FIG. 11.

An alternative embodiment of a test stand according to the present invention is shown in FIGS. 10-12. Instead of a solid forward frame 102 as used in stand 100, the alternative embodiment incorporates a forward frame assembly 302 constructed from a plurality of separate members that can be removably connected to each other to assemble the stand, and disconnected from each other to disassemble the stand for transport and/or storage.

Forward frame assembly 302 includes a first forward portion 304 that retains a first roller assembly having rollers 108, 110, similar to frame 102 as described above. Similarly, forward frame assembly 302 further includes a second forward portion 306 that retains a second roller assembly having rollers 112, 114. In this embodiment, tone wheel 190 is mounted on roller 114.

First forward portion 304 is releasably couplable to second forward portion 306 via a pair of locator bars 310. Each locator bar 310 includes a first end 312 couplable to first forward portion 304 and a second end 314 couplable to second forward portion 306.

A coupling link 320, shown in FIG. 12, couples first end 312 to first forward portion 304, while another coupling link 320 couples second end 314 to second forward portion 306. Coupling link 320 has a generally "S" shape, with a first end 322 that is inserted into a hollow (not shown) in either of first forward portion 304 or second forward portion 306. A second end 324 is inserted into a hollow (not shown) in either of first end 312 or second end 314 of locator bar 310. A clamp 326 secures coupling link 320 to locator bar 310 for structural stability. An intermediate portion 328 can be provided to elevate locator bar 310 above forward frame assembly 302.

To add stability to forward frame assembly 302, tie downs 330 are removably attachable to forward frame assembly 302. Tie downs 330 can be hollow box beams that can be inserted over extensions (not shown) that extend from each of first forward portion 302 and second forward portion 304. As shown in FIG. 10, tie downs 330 extend forward of forward frame assembly 302, although those skilled in the art will recognize that tie downs 330 can be located other places on forward frame assembly 302.

An adjustable shaft 340 is removably attachable to one each of rollers 108, 110 and rollers 112, 114 on first forward portion 302 and second forward portion 304, respectively. As shown in FIG. 10, adjustable shaft 340 is attached to one each of rollers 110 and 114, although thoe skilled in the art will recognize that shaft 340 can be attached to roller 108 and 112 instead. Shaft 340 includes a first portion 342 attachable to roller 110 and a telescoping second portion 344 that is attachable to roller 114. A clamp 346 can be tightened to secure first portion 342 and second portion 344 to each other after first forward portion 304 and second forward portion 306 are set.

Referring to FIG. 11, a rear frame assembly 350 includes a first rear frame portion 354 and a second rear frame portion 356. Rear frame assembly 350 can be identical to forward frame assembly 302 with the exception that shaft 340 is omitted with respect to rear frame assembly 350. Additionally, instead of extending forward from forward frame assembly 302, tie downs 330 extend rearward from rear frame assembly 350, as shown in FIG. 11.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A modular portable speedometer calibration stand comprising:
    a forward frame including:
        a first pair of forward rollers rotatably attached to the forward frame;
        a second pair of forward rollers rotatably attached to the forward frame; and
        a speed measuring device operatively coupled to a roller on one of the first and second pair of forward rollers; and
    a rear frame, separate from the forward frame, the rear frame including:
        a first pair of rear rollers rotatably attached to the rear frame;
        a second pair of rear rollers rotatably attached to the rear frame;
        a first forward portion retaining the first pair of forward rollers;
        a second forward portion retaining the second pair of forward rollers; and
        a locator bar having a first end removably insertable into the first forward portion and a second end removably insertable into the second forward portion.

2. The modular portable speedometer calibration stand according to claim 1, further comprising a shaft removably connectable to one of the first pair of forward rollers and one of the second pair of forward rollers.

3. The modular portable speedometer calibration stand according to claim 2, wherein the shaft has an adjustable length.

4. The modular portable speedometer calibration stand according to claim 1, wherein the forward frame comprises a first ramp aligned to allow a first vehicle tire to roll onto the first pair of forward rollers and a second ramp aligned to allow a second vehicle tire to roll onto the first pair of forward rollers.

5. The modular portable speedometer calibration stand according to claim 1, wherein the rear frame comprises a first rear ramp aligned to allow a first vehicle tire to roll onto the first pair of rear rollers and a second rear ramp aligned to allow a second vehicle tire to roll onto the first pair of rear rollers.

6. The modular portable speedometer calibration stand according to claim 5, further comprising a first intermediate ramp having a first ramp end, distal from the first rear ramp.

7. The modular portable speedometer calibration stand according to claim 6, further comprising a plate removably disposable over the first pair of rear rollers between the first rear ramp and the first intermediate ramp.

8. The modular portable speedometer calibration stand according to claim 1, wherein the rear frame comprises:
a first rear portion retaining the first pair of rear rollers;
a second rear portion retaining the second pair of rear rollers; and
a connecting bar slidably releasably the first rear portion to the second rear portion.

9. The modular portable speedometer calibration stand according to claim 8, wherein each of the first rear portion and the second rear portion is supported by a plurality of wheels.

10. The modular portable speedometer calibration stand according to claim 1, wherein the speed measuring device comprises:
a tone wheel coupled to the roller;
a proximity sensor in operative relation to the tone wheel; and
a display,
such that the proximity sensor detects the rotation speed of the tone wheel and transmits an electronic signal to the display.

11. The modular portable speedometer calibration stand according to claim 1, wherein each of the forward and rear rollers comprises a plurality of radially spaced slots extending along an outer perimeter of each of the forward and rear rollers.

12. The modular portable speedometer calibration stand according to claim 1, further comprising a shaft having a first end connected to one of the first pair of rollers and a second end connected to one of the second pair of rollers.

13. The modular portable speedometer calibration stand according to claim 12, wherein the shaft is extendible.

14. A modular portable speedometer calibration stand comprising:
a forward frame including:
a first pair of forward rollers rotatably attached to the forward frame;
a second pair of forward rollers rotatably attached to the forward frame; and
a speed measuring device operatively coupled to a roller on one of the first and second pair of forward rollers;
a rear frame, separate from the forward frame, the rear frame including:
a first pair of rear rollers rotatably attached to the rear frame; and
a second pair of rear rollers rotatably attached to the rear frame; and
a locking mechanism adapted to releasably lock at least one of the rollers of the first pair of rear rollers and the second pair of rear rollers
wherein each of the at least one roller has an opening, and wherein the locking mechanism is adapted to be removably inserted into the opening.

15. A modular portable speedometer calibration stand comprising:
a forward frame including:
a first pair of forward rollers rotatably attached to the forward frame;
a second pair of forward rollers rotatably attached to the forward frame; and
a speed measuring device operatively coupled to a roller on one of the first and second pair of forward rollers; and
a rear frame, separate from the forward frame, the rear frame including:
a first pair of rear rollers rotatably attached to the rear frame;
a second pair of rear rollers rotatably attached to the rear frame
wherein the forward frame further comprises a first brake disposed under one of the first pair of forward rollers and a second brake disposed under one of the second pair of forward rollers, and
wherein each of the first brake and the second brake comprises an inflatable air bag.

16. A modular portable speedometer calibration stand comprising:
a first forward frame portion including a first pair of forward rollers;
a second forward frame portion including a second pair of forward rollers and a second coupler;
a speed measuring device operatively coupled to a roller on one of the first and second pair of forward rollers;
a forward locator bar adapted to be removably inserted into each of the first forward frame portion and the second forward frame portion;
a first rear frame portion including a first pair of rear rollers;
a second rear frame portion including a second pair of rear rollers;
a rear locator bar adapted to removably connect the first rear frame portion and the second rear frame portion to each other;
a first ramp assembly extending between the first forward frame portion and the first rear frame portion; and
a second ramp assembly extending between the second forward frame portion and the second rear frame portion.

17. The modular portable speedometer calibration stand according to claim 16, wherein the first ramp assembly comprises a first forward ramp attached to the first forward frame portion and a first rear ramp attached to the first rear portion, wherein the first rear ramp engages the first forward ramp.

* * * * *